April 16, 1968 A. GABOR 3,378,826

RANDOM ACCESS STORAGE DEVICE EMPLOYING FLEXIBLE TAPES

Filed July 28, 1964 14 Sheets-Sheet 1

INVENTOR
ANDREW GABOR
BY
Douglas M. Clarkson
ATTORNEY

RANDOM ACCESS STORAGE DEVICE EMPLOYING FLEXIBLE TAPES

INVENTOR.
ANDREW GABOR

Douglas M. Clarkson
ATTORNEY

April 16, 1968 A. GABOR 3,378,826

RANDOM ACCESS STORAGE DEVICE EMPLOYING FLEXIBLE TAPES

Filed July 28, 1964 14 Sheets-Sheet 3

INVENTOR.
ANDREW GABOR
BY
Douglas M. Clarkson
ATTORNEY

April 16, 1968 A. GABOR 3,378,826

RANDOM ACCESS STORAGE DEVICE EMPLOYING FLEXIBLE TAPES

Filed July 28, 1964 14 Sheets-Sheet 4

INVENTOR
ANDREW GABOR
BY Douglas M. Clarkson
ATTORNEY

INVENTOR
ANDREW GABOR
BY Douglas M. Clarkson
ATTORNEY

RANDOM ACCESS STORAGE DEVICE EMPLOYING FLEXIBLE TAPES

Filed July 28, 1964 14 Sheets-Sheet 6

INVENTOR.
ANDREW GABOR
BY Douglas M. Clarkson
ATTORNEY

RANDOM ACCESS STORAGE DEVICE EMPLOYING FLEXIBLE TAPES

INVENTOR
ANDREW GABOR

BY Douglas M. Clarkson
ATTORNEY

April 16, 1968 A. GABOR 3,378,826

RANDOM ACCESS STORAGE DEVICE EMPLOYING FLEXIBLE TAPES

Filed July 28, 1964 14 Sheets-Sheet 8

INVENTOR
ANDREW GABOR

BY Douglas M. Clarkson
ATTORNEY

INVENTOR
ANDREW GABOR
BY Douglas M. Clarkson
ATTORNEY

RANDOM ACCESS STORAGE DEVICE EMPLOYING FLEXIBLE TAPES

Filed July 28, 1964

INVENTOR.
ANDREW GABOR

BY Douglas M. Clarkson
ATTORNEY

RANDOM ACCESS STORAGE DEVICE EMPLOYING FLEXIBLE TAPES

INVENTOR
ANDREW GABOR

BY Douglas M. Clarkson
ATTORNEY

RANDOM ACCESS STORAGE DEVICE EMPLOYING FLEXIBLE TAPES

INVENTOR
ANDREW GABOR
BY
Douglas M. Clarkson
ATTORNEY

RANDOM ACCESS STORAGE DEVICE EMPLOYING FLEXIBLE TAPES

Filed July 28, 1964 14 Sheets-Sheet 13

INVENTOR
ANDREW GABOR

BY
Douglas M. Clarkson
ATTORNEY

April 16, 1968 A. GABOR 3,378,826

RANDOM ACCESS STORAGE DEVICE EMPLOYING FLEXIBLE TAPES

Filed July 28, 1964 14 Sheets-Sheet 14

INVENTOR
ANDREW GABOR

BY Douglas M. Clarkson
ATTORNEY 3,378,826

RANDOM ACCESS STORAGE DEVICE EMPLOYING FLEXIBLE TAPES

Andrew Gabor, Huntington, N.Y., assignor to Potter Instrument Company, Inc., Plainview, N.Y., a corporation of New York Filed July 28, 1964, Ser. No. 385,727
11 Claims. (Cl. 340—174.1)

ABSTRACT OF THE DISCLOSURE

This disclosure contains drawings and a description of information storage apparatus which includes a plurality of cartridges, unlimited in number, each containing a plurality of information storage tapes. The apparatus includes supporting and transducing means by which each cartridge may be mounted interchangeably with the others of the cartridges to perform transducing operations on the tapes and to provide random access to any selected address on storage tracks on each tape within a minimum amount of time.

This invention generally relates to information storage devices and, more particularly, to a magnetic tape-random access-information memory.

Random access memories are used in digital computers and other data processing equipment to store information to be used or operated upon by data processing equipment and to provide such stored information to the data processing equipment quickly from any selected random location or "address" in the memory. The random access memories prior to the present invention, for given capacities of stored information, require too much time to find a selected address at random and to read the information out from the selected address, or other mechanical limitations have made them impractical.

Accordingly, an object of the present invention is to provide an improved random access information storage memory.

A further object of the present invention is to provide a small compact random access memory with a large capacity and a short access time.

A still further object of the invention is to increase the capacity of random access memories.

Another object of this invention is to provide a random access memory in which the memory elements can be quickly and easily interchanged with other memory elements.

Still another object of the present invention is to facilitate the interchanging of the memory elements in a storage device with other memory elements.

A still further object of the present invention is to provide an improved system of selecting recording tracks for transducer operations with a storage medium.

A further object of the present invention is to provide a random access memory with an improved address selecting system.

Yet another object of the present invention is to provide an improved system for selecting one out of a plurality of magnetic tapes for transducer operations.

Still another object of the present invention is to improve transducer operations from magnetic tapes when the tapes are driven at high speeds.

A still further object of the present invention is to take advantage of an aerodynamic effect, causing the tape to fly, to minimize tape and head wear.

Briefly, a random access information storage memory device in accordance with the invention includes a plurality of cartridges each containing a plurality of information storage tapes. A supporting means on the memory device permits the cartridges, to be mounted interchangeably for transducer operations with the tapes contained by each cartridge, and the memory device also includes means to select one of the tapes for such transducer operations.

The present invention provides an improved random access information storage device which has a large capacity, yet which is small and compact and which permits access to any selected random address in a minimum of time. Moreover, the storage elements of the memory can be interchanged quickly and easily with the other storage elements. This feature in effect further multiplies the capacity of the memory.

In accordance with the presently preferred form of the invention, information in a binary form is stored on magnetic tape loops. Sixteen magnetic tape loops are mounted in a cartridge which is interchangeable with other cartridges containing additional tape loops. Each tape loop has forty-eight tracks of information. A vacuum duct system is provided for selecting one of the magnetic tapes in a cartridge and means are provided to select one of the tracks on the selected tape loop. The selection of the desired track on the selected tape loop is made, in part, by a mechanical movement of the transducing heads. By an incremental movement, the transducing heads are positioned in any one of sixteen preselected incremental positions, in response to a four digit binary input representation.

In order to obtain quick access to the information stored at a selected address, the tape loops are driven at a very high speed. At such high speeds, under favorable conditions, the tape, instead of remaining in contact with the head, is separated and floats on an air cushion. The present invention utilizes this areodynamic effect to eliminate wear of the oxide coating.

However, the same aerodynamic effect that causes the tape to float over the head, has another by-product: the tape does not follow the contour of the head, and the point of lowest flying altitude is shifted from the center of the virtual contact angle.

In accordance with the present invention this aerodynamic effect is compensated for by shifting the position of the tape guides slightly with respect to the transducing heads.

Further objects and advantages of the present invention will become more readily apparent from the following detailed description of a presently preferred form of the invention and when taken in conjunction with the drawings wherein.

*General description*

Figure 1:
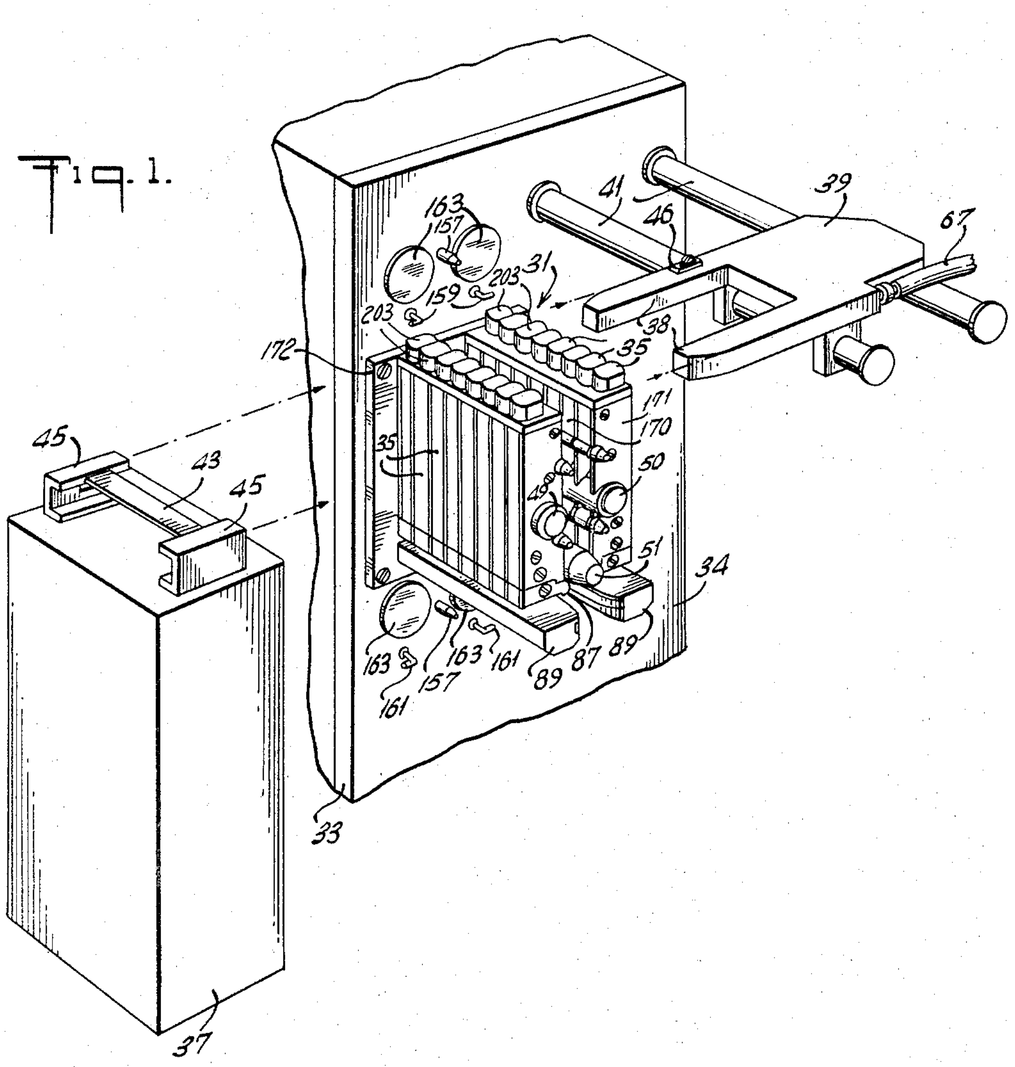
FIG. 1 is a perspective view of the random access memory of the present invention with one of the cartridges in which the tape loops are stored ready to be mounted.

As shown in FIG. 1, the random access memory of the present invention comprises a transducer assembly designated generally by the reference number 31. This transducer assembly is mounted on a supporting wall 33 and extends out horizontally from the front 34 of the wall 33. While any desired number of transducing units may be selected, the transducer assembly 31 shown in the drawings includes sixteen transducing units 35 arranged in two parallel rows extending out from the wall 33. Each transducer unit 35 will function to record on or to reproduce from a different one of the sixteen magnetic tapes which are mounted in a removable cartridge 37.

The cartridge 37 is mounted removably on two arms 38 of a carriage 39, which in turn is mounted slidably on two parallel bars 41. The bars 41 extend out horizontally from the front 34 of the supporting wall 33, and the carriage 39 is movable on the bars 41 between an "out" position, which is the position in which it is shown in FIG. 1, and an "in" position, in which the carriage is adjacent the wall 33.

When the cartridge 37 is mounted on the carriage 39 and when the carriage is slid from its "out" position to its "in" position, the cartridge 37 will surround the transducer assembly 31, and the tapes mounted in the cartridge will be brought in transducing relationship with the transducer units 35. Although only one cartridge is illustrated in FIG. 1, a plurality of cartridges are provided so that access may be readily obtained to a large number of tapes.

Access to a tape not in the particular cartridge which is mounted on the carriage 39 is obtained simply by changing cartridges. A change of cartridges is achieved by moving the carriage from its "in" position to its "out" position, sliding the cartridge sideways off of the arms 38 of the carriage 39, sliding the new cartridge onto the arms 38, and then, sliding the carriage back to its "in" position, thus moving the tapes in the new cartridge into transducing relationship with the transducer units 35.

Figure 2:
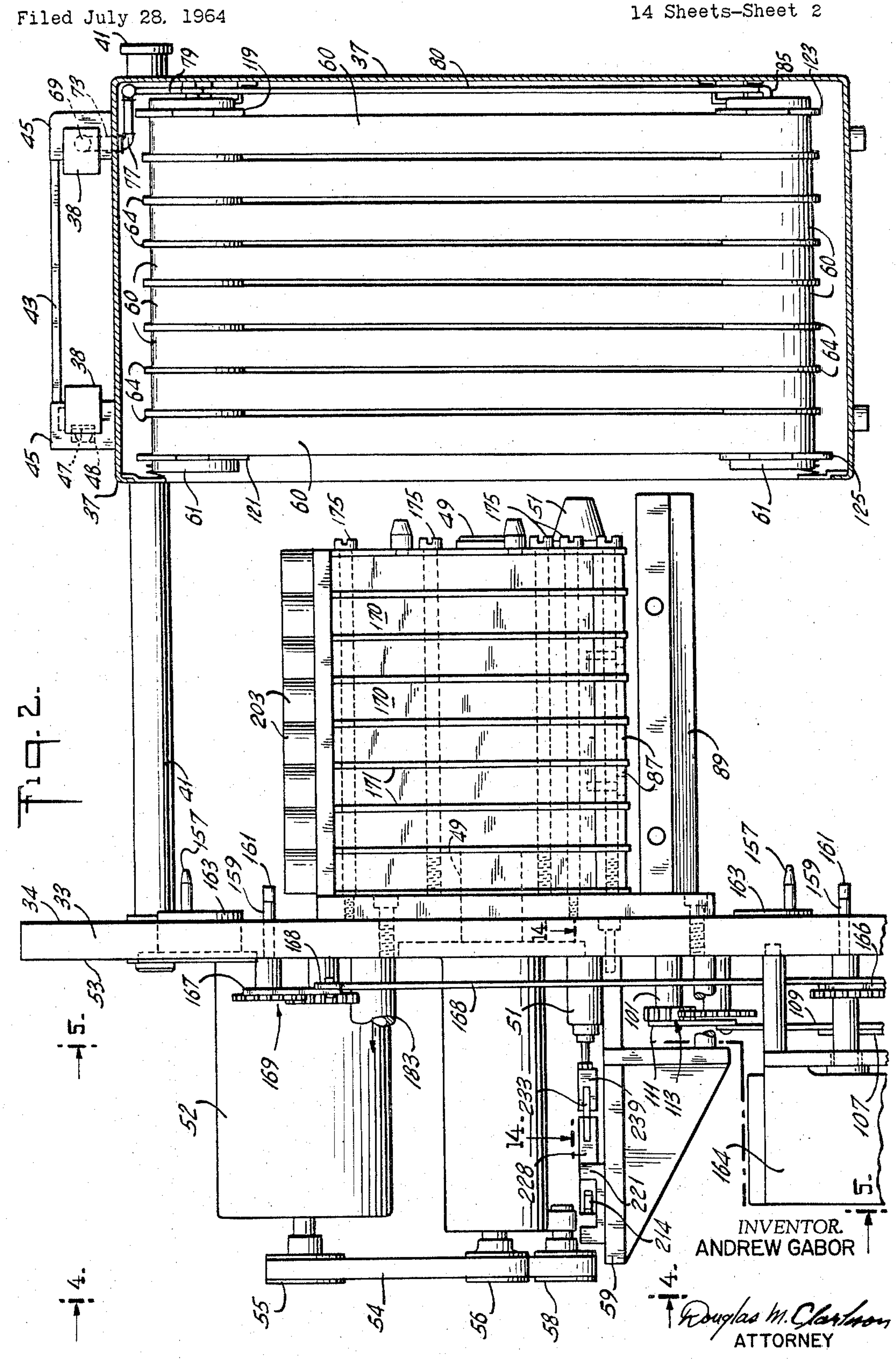
FIG. 2 is a side view in elevation of the random access memory of the present invention with a cartridge in the process of being mounted.
Figure 3:
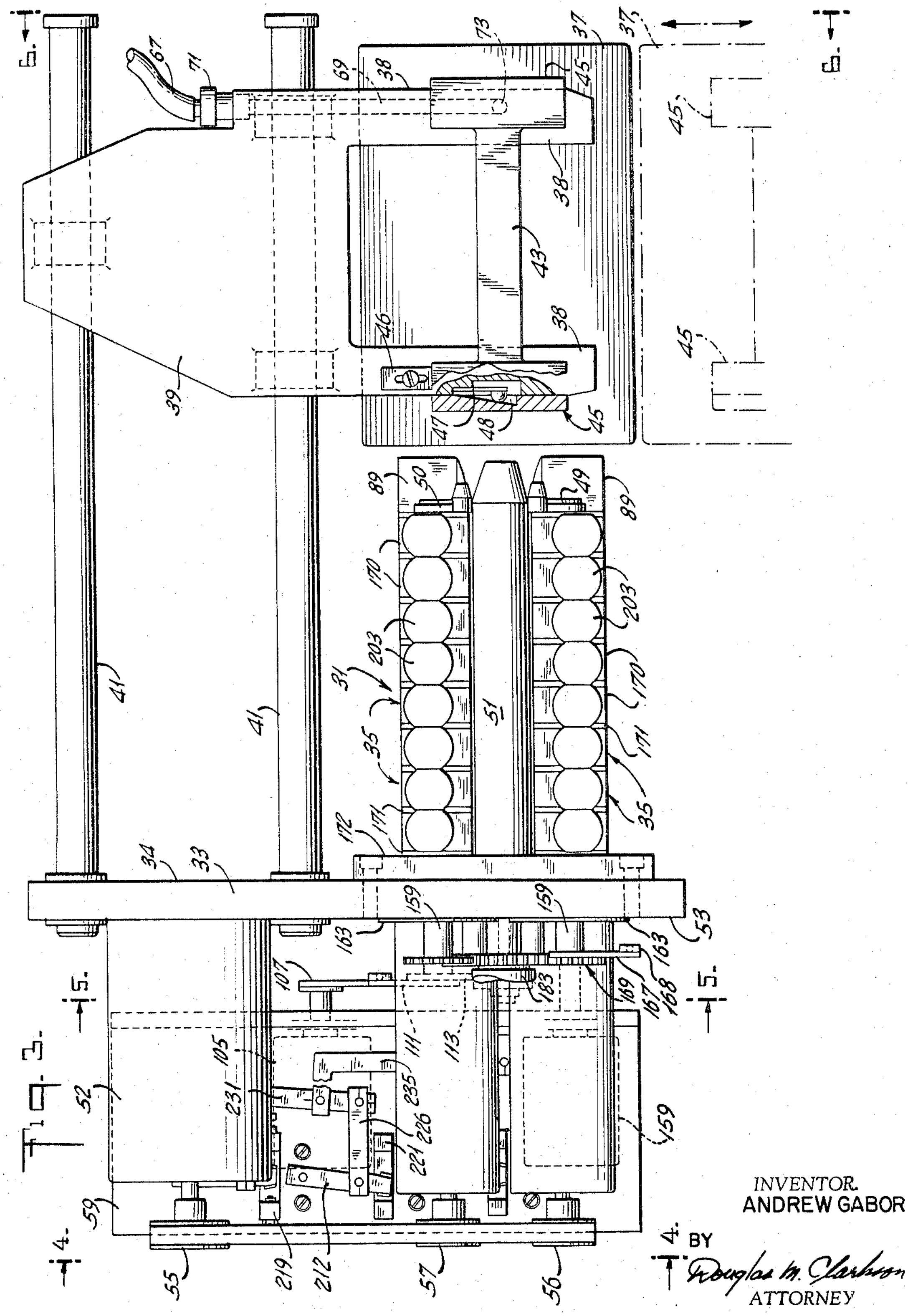
FIG. 3 is a top plan view of the random access memory with the cartridge in the same position as in FIG. 2.

As exemplified by the cartridge 37 in FIG. 1, each cartridge is provided with a handle 43 mounted between two U-shaped brackets 45 which, as shown in FIGURES 2 and 3 fit around the arms 38 of the carriage 39 and make a sliding engagement with the arms 38, so that the brackets can be slid sideways over the arms 38 to remove the cartridge from or to mount the cartridge on the carriage 39. When the cartridge is mounted on the carriage 39, it is slid onto the arms 38 until one of the U-shaped brackets 45 abuts against a stop 46 fixed to the top of the carriage 39. As shown best in FIG. 3, a spring detent 47 is mounted on one of the arms 38 to engage within a cavity 48 defined in the corresponding bracket 45 for holding the cartridge on the arms 38 after it has been slid against the stop 46.

The transducer assembly 31 is provided with means to select one of the sixteen tapes for a transducing operation and is provided with means to select one of a great number of tracks (such as forty-eight tracks, for example) on the selected tape. These selecting means will be described in more detailed presently. The transducing assembly 31 is provided with two capstans 49 and 50, each common to the transducer units 35 of a different row.

A cylindrical bar 51 carries magnetic transducer heads for each of the transducer units. The cylindrical bar 51 is referred to as a "head carrier." The capstans 49 and 50 are operable to drive the tapes mounted in the cartridge 37 when the cartridge 37 is mounted on the carriage 39 and is brought into its transducing position surrounding the transducing assembly 31. The capstans 49 and 50 are driven by a motor 52 mounted on the back 53 of the wall 33.

Figure 4:
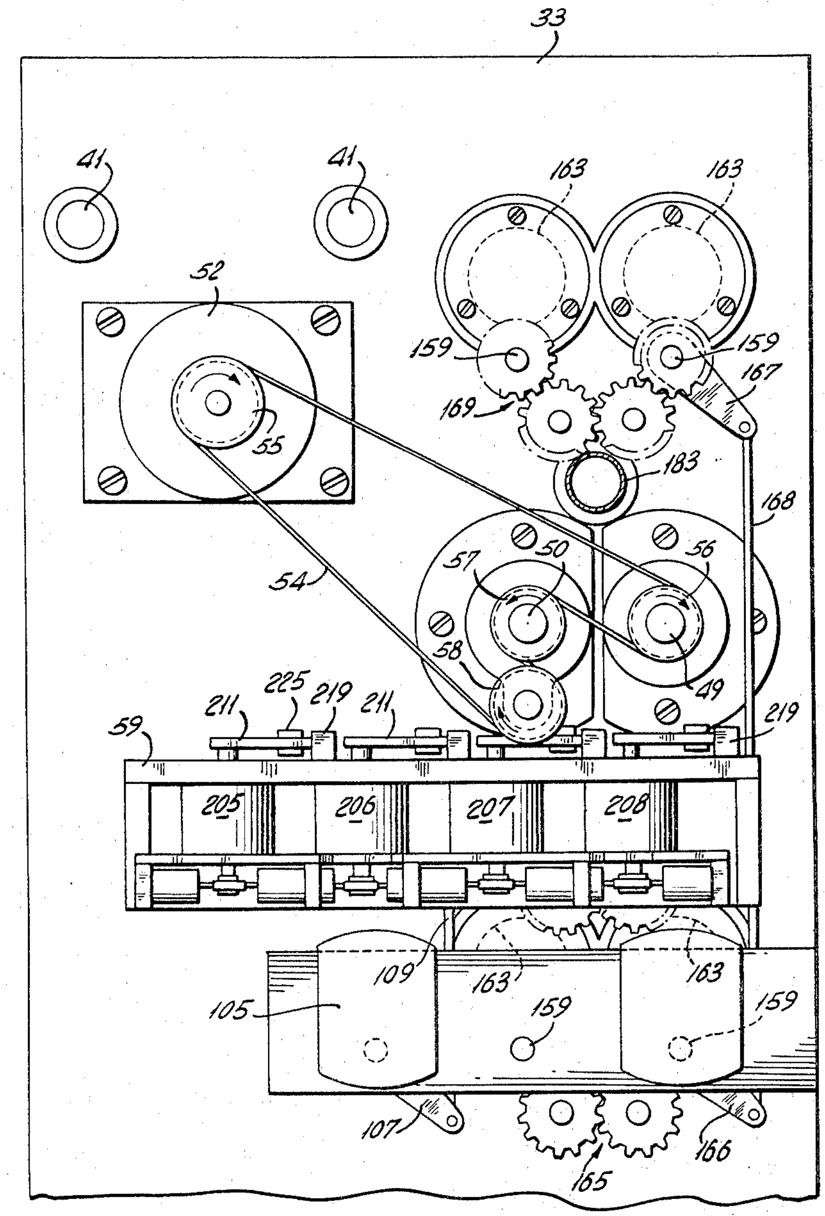
FIG. 4 is a view in elevation of the back of the random access memory.

The motor 52 drives the capstans 49 and 50 by means of a belt 54 that is best shown in FIG. 4. The belt 54 passes around a pulley 55 connected to the shaft of the motor 52, around pulleys 56 and 57 connected to the ends of the capstans 49 and 50, respectively, and around an idler pulley 58. The belt 54 wraps around the pulleys 56 and 57 to drive the capstans in opposite directions, and the idler pulley 58 serves to provide a sufficient wrap angle around the pulley 57 to enable the belt 54 to grip the pulley 57 sufficiently. The manner in which the capstans 49 and 50 drive the magnetic tapes will be described in more detail hereinafter.

A track selection on a preselected magnetic tape is made in part by moving the cylindrical head carrier 51 axially. This axial movement is produced by means of a whippletree mechanism 59 mounted on the back 53 of the wall 33 as shown in FIG. 4. The details of how the whippletree mechanism moves the head carrier 51 axially and how this axial movement makes a track selection on the selected magnetic tape will be described in more detail, also, hereinafter.

The magnetic tapes mounted in the cartridge 37 are in the form of endless tape loops arranged in two parallel rows of eight each to cooperate with the two parallel rows of transducer units 35. As shown in FIG. 2 and in FIGS. 7–10, the tape loops are designated generally by the reference number 60. Each row of eight tape loops is mounted and is supported between two cylindrical members 61 referred to as "turn-arounds." Since each row of eight tape loops requires to turn-arounds, each cartridge will have four turn-arounds 61.

A plurality of spaced-apart annular plates 64 are mounted on the turn-arounds 61 extending circumferentially around the turn-arounds. These plates 64 are axially spaced at regular intervals along the turn-arounds and define channels in which the tape loops are positioned on the turn-arounds. Thus, the plates 64 keep the tapes separated and in position and, therefore, are referred to as separator plates.

When one of the tape loops is selected for a transducing operation, the corresponding transducer unit 35 will bring the tape loop into engagement with either the capstan 49 or the capstan 50, and the selected capstan will drive the tape loop in a spinning fashion. As the tape is spun, it will move over the turn-arounds 61 on a cushion of air, which is referred to as an air bearing.

This cushion of air is produced between the turn-arounds 61 and the tapes 60 by air passing out from the hollow interiors of the turn-arounds through apertures 65 formed in that part of the turn-arounds 61 which is adjacent the tape loops 60, as is illustrated best in FIGS. 7 and 8 and 19 and 20. The pressurized air is supplied to the turn-arounds 61 through the U-shaped brackets 45 from the arms 38 of the carriage 39. This feature is illustrated best in FIGS. 2, 3, 6 and 8.

Air is supplied to the carriage 39 through a flexible hose 67 which, by means of a fitting 71, connects to an air passageway 69 defined in the carriage 39. The passageway 69 extends out into one of the arms 38 to an opening 73 defined in the bottom of the arm 38. The opening 73 is positioned to be covered by one of the U-shaped brackets 45 when the cartridge 37 is mounted on the arms 38.

Figures 7, 8:
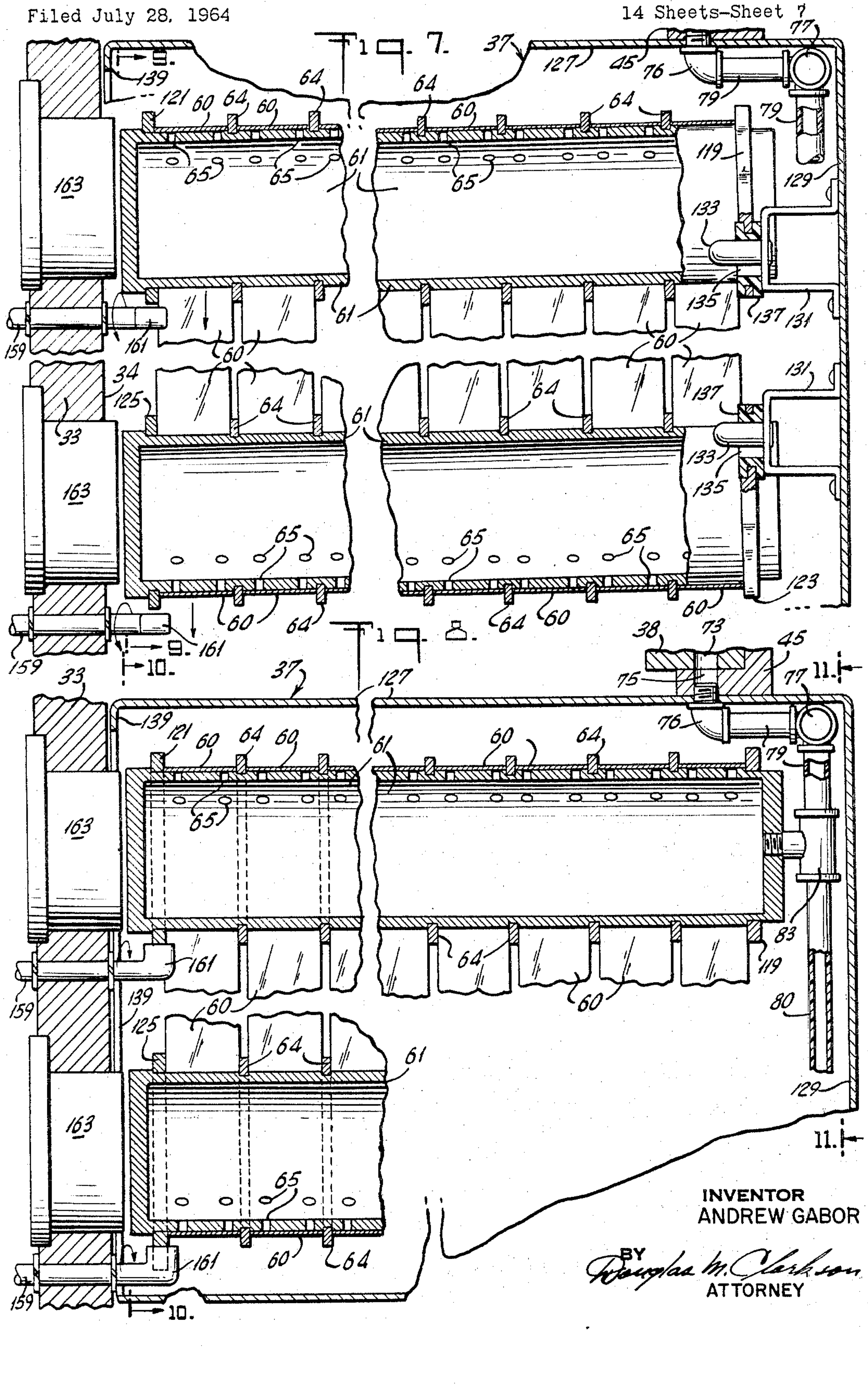
FIGS. 7 and 8 show sectional views partly broken away taken through a storage cartridge at different positions in the process of being mounted.

When the cartridge 37 is properly positioned on the arms 38 against the stop 46, the opening 73 will register with a corresponding opening 75 defined in the lower leg of one of the U-shaped brackets 45, so that the air supplied to the passageway 69 by the hose 67 will pass through the opening 73 and into the opening 75 when the cartridge 67 is mounted on the arms 38. The opening 75 is best illustrated in FIG. 8.

Figure 11:
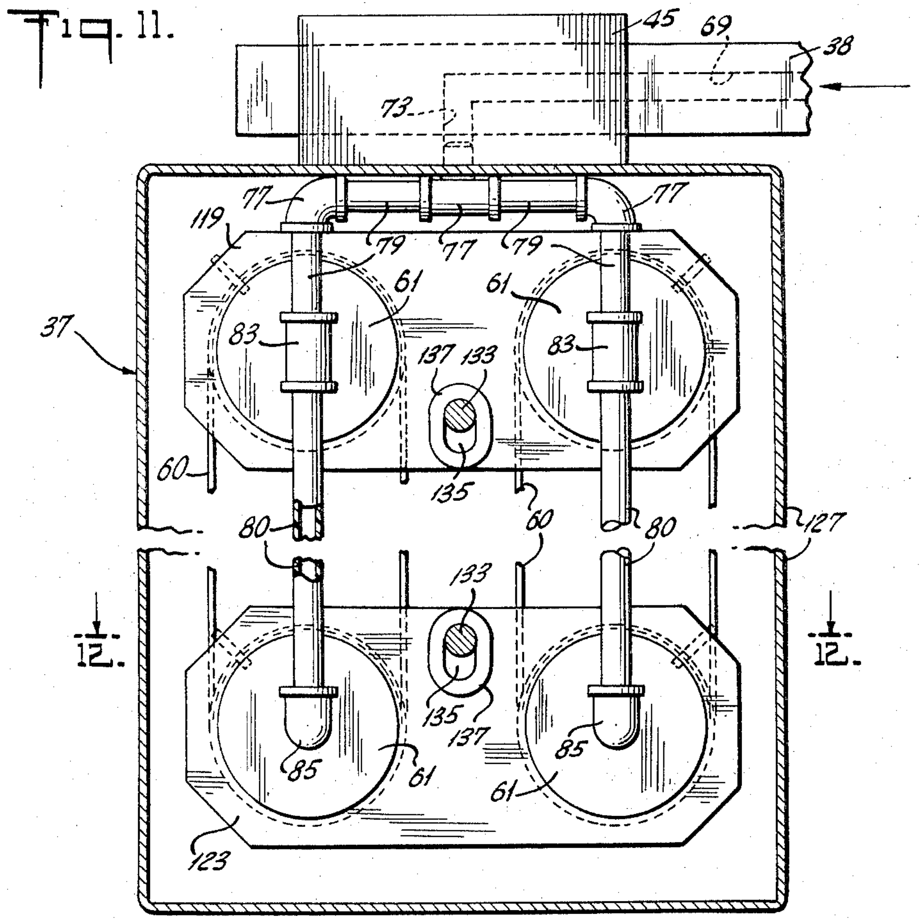
FIG. 11 is a sectional view taken along lines 11—11 of FIG. 8.

Air supplied from the hose 67, after passing through the passageway 69 into the opening 75, passes through passageways leading into the turn-arounds 61. These latter passageways are provided by hoses 79 and 80 and couplings 76, 77, 83 and 85 as shown in FIGURES 8 and 11. The hoses 79 and 80 are flexible for reasons to be explained below. In this manner, pressurized air is supplied to the hollow interior of the turn-arounds 61, and thus, the cushions of air between the turn-arounds 61 and the tape loops 60 are generated.

Because the air pressure is supplied to the turn-arounds through the arms 38, the air cushions will be produced as soon as the cartridge 37 is mounted on the arms 38. This applies a slight tension to the tape loops 60 and, in this manner, keeps them in place while the carriage 39 is moving the cartridge to the position where it surrounds the transducer assembly 31. It is important that the tape loops 60 be held firmly in position while the cartridge is being moved by the carriage to the position surrounding the transducer assembly 31, because the tapes must be guided around obstructions.

Figures 17, 18:
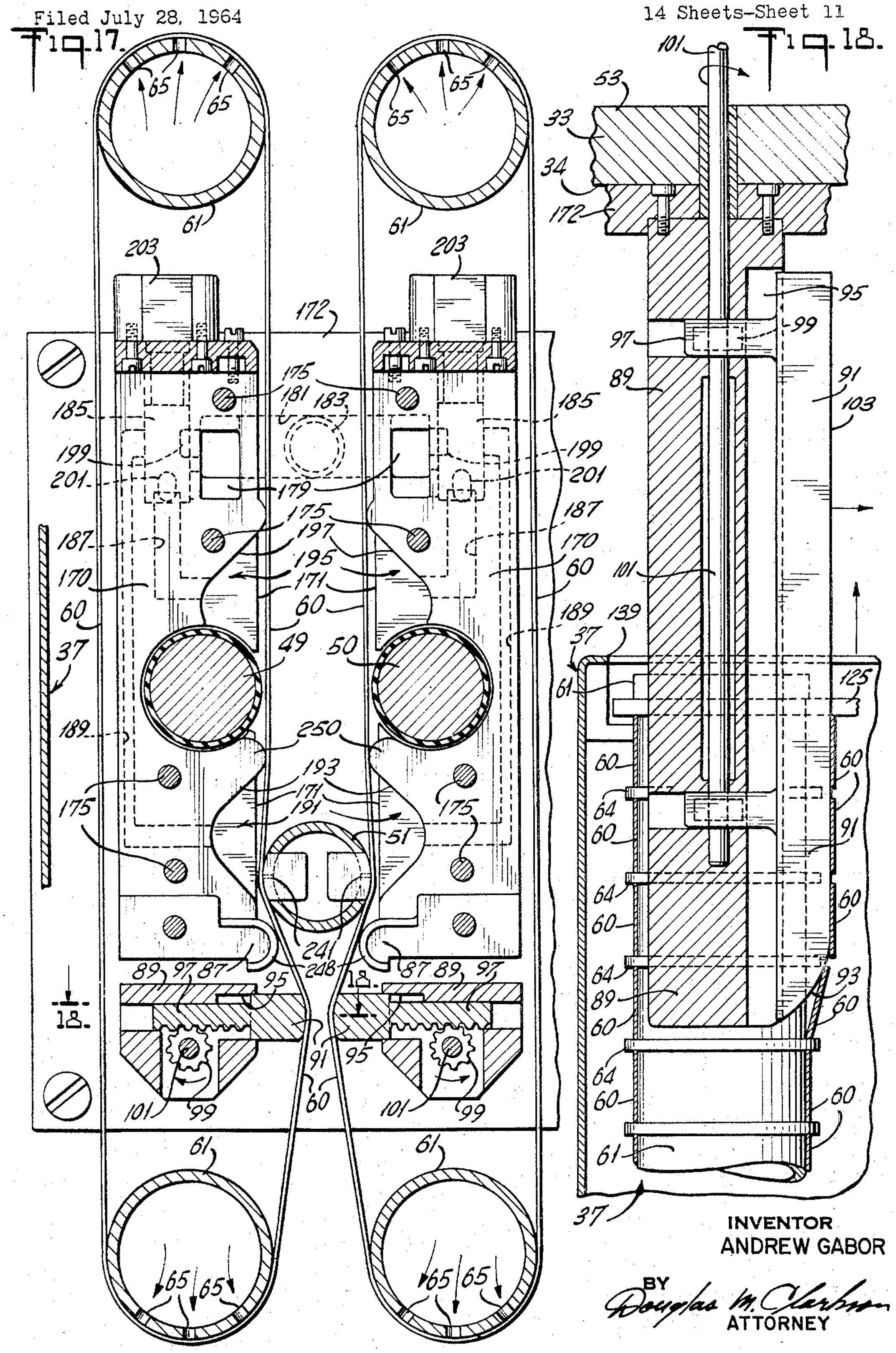
FIG. 17 is a sectional view in elevation of the memory as a tape cartridge is in the process of being moved into its transducing position.
FIG. 18 is a sectional view taken along lines 18—18 of FIG. 17.

These obstructions, which are tape guides for accurately positioning the tape loops when they are being driven by the capstans, are designated generally by the reference number 87 and can be seen in FIGS. 17 and 18, which figures also illustrate how the tape loops are guided around the tape guides 87 as the cartridge is being moved by the carriage 39 into or out from its transducing position.

As shown in FIGS. 17 and 18, a pair of spreaders 89, one for each row of tape loops, is provided below the two rows of transducing units 35. The spreaders 89 each comprise a tape cam 91 which is formed with an arcuate or curved surface 93 for guiding the tape away from the tape guides 87. The cams 91, which extend along the full length of the rows of transducer units 35, are movable in the horizontal direction parallel to the supporting wall 33. This lateral movement of the cams 91 is guided within grooves 95 defined in the spreaders 89 and is effected by means of ratchets 97 connected to the cams 91.

Figures 19, 20:
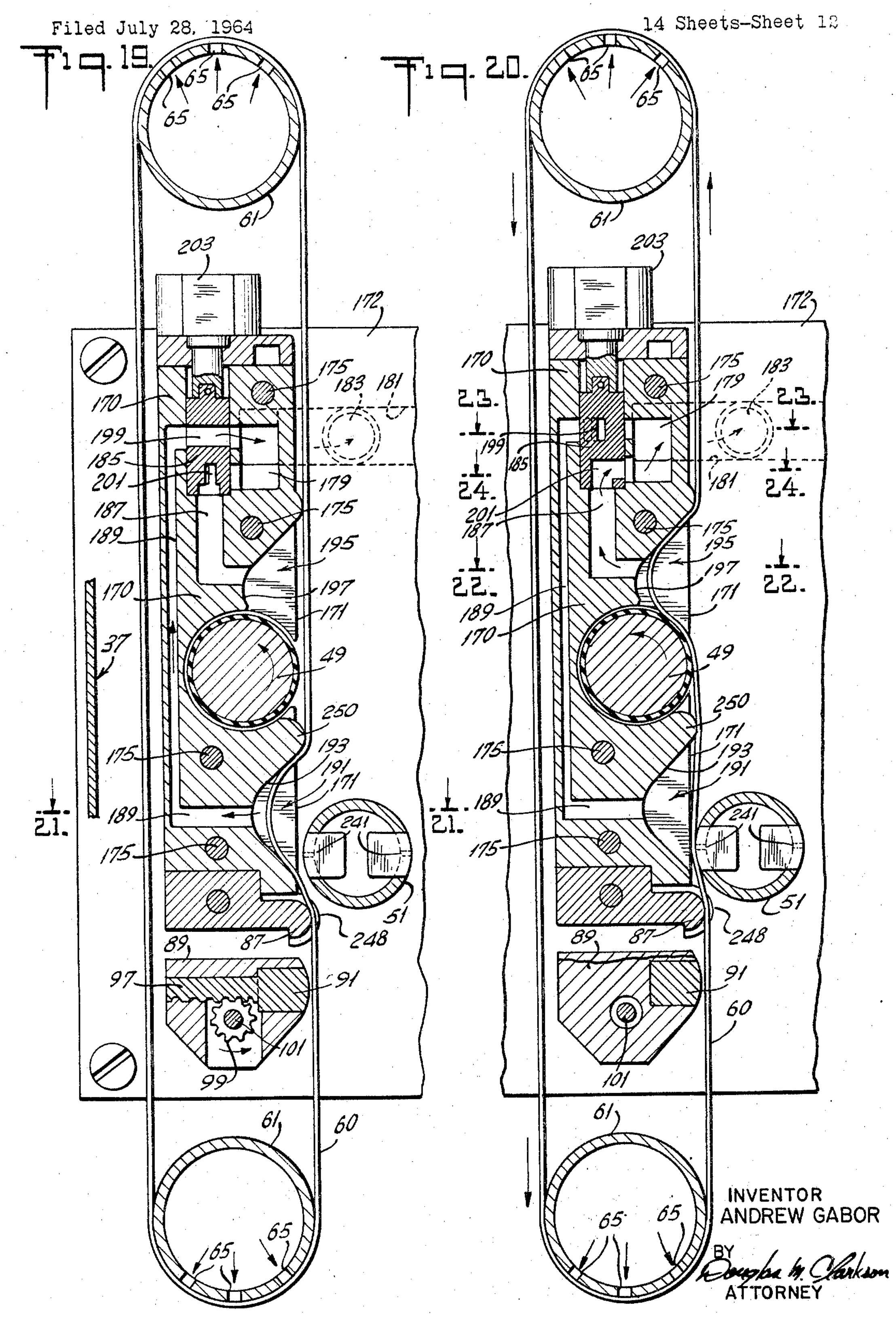
FIGS. 19 and 20 are sectional views in elevation taken through the random access memory with a tape cartridge mounted ready for a transducer operation, with FIG. 19 illustrating the position of a tape loop when a transducer operation is not being carried out and FIG. 20 illustrating the position of a tape loop when a transducer operation is being carried out.

Each cam 91 is connected along the lengths of two ratchets 97 at spaced-apart points, and the ratchets 97 co-act with pinions 99 mounted on and fixed to shafts 101. The shafts 101 extend through the spreaders 89 and through the wall 33. When the shafts 101 are rotated, the pinions 99 drive the ratchets 97 to move the tape cams 91 laterally between their extended positions, in which they are shown in FIGS. 17 and 18, and their retracted positions, in which they are shown in FIGS. 19 and 20.

When a cartridge is moved by the carriage from the position shown in FIG. 2 to the transducing position where the cartridge surrounds the transducer assembly 31, the tape cams 91 will be in their extended position. Then, when the cartridge is moved by the carriage toward the wall 33, the tapes 60 will be moved successively into engagement with the arcuate surface 93 and be cammed out to a position where they clear the guides 87. The tapes also come into engagement with the beveled nose of the head carrier 51 at the same time that they come into engagement with the tape cams 91 and are guided to the sides of the head carrier.

Each of the cams 91 is provided with an elongated straight surface 103 extending perpendicular to the wall 33. This surface 103 holds the tapes 60 in a position where they clear the tape guides 87 until the cartridge has moved all the way into its transducing position. The shafts 101 then are rotated to move the cams 91 to their retracted position. This permits the tapes 60 to fall back on the tape guides 87, as shown in FIGS. 19 and 20, where the tapes are ready for a transducing operation.

In a similar manner, when it is desired to remove a cartridge from the transducer assembly, the shafts 101 are rotated first to extend the cams 91, thereby moving the tapes 60 to the position where they clear the tape guides 87. The carriage 39 then moves the cartridge out from its transducing position while the cams 91 maintain the tapes 60 clear of the tape guides 87. It is important that tape loops 60 be maintained in slight tension when the cartridge is being moved into or out from its transducing position because the tensioning of the tape loops prevents the tape loops from being dragged sideways by the cams 91 as the cartridge is being moved. As described above, this tensioning of the tape loops 60 is provided by the air passing through the apertures 65 in the turn-arounds 61.

Figure 5:
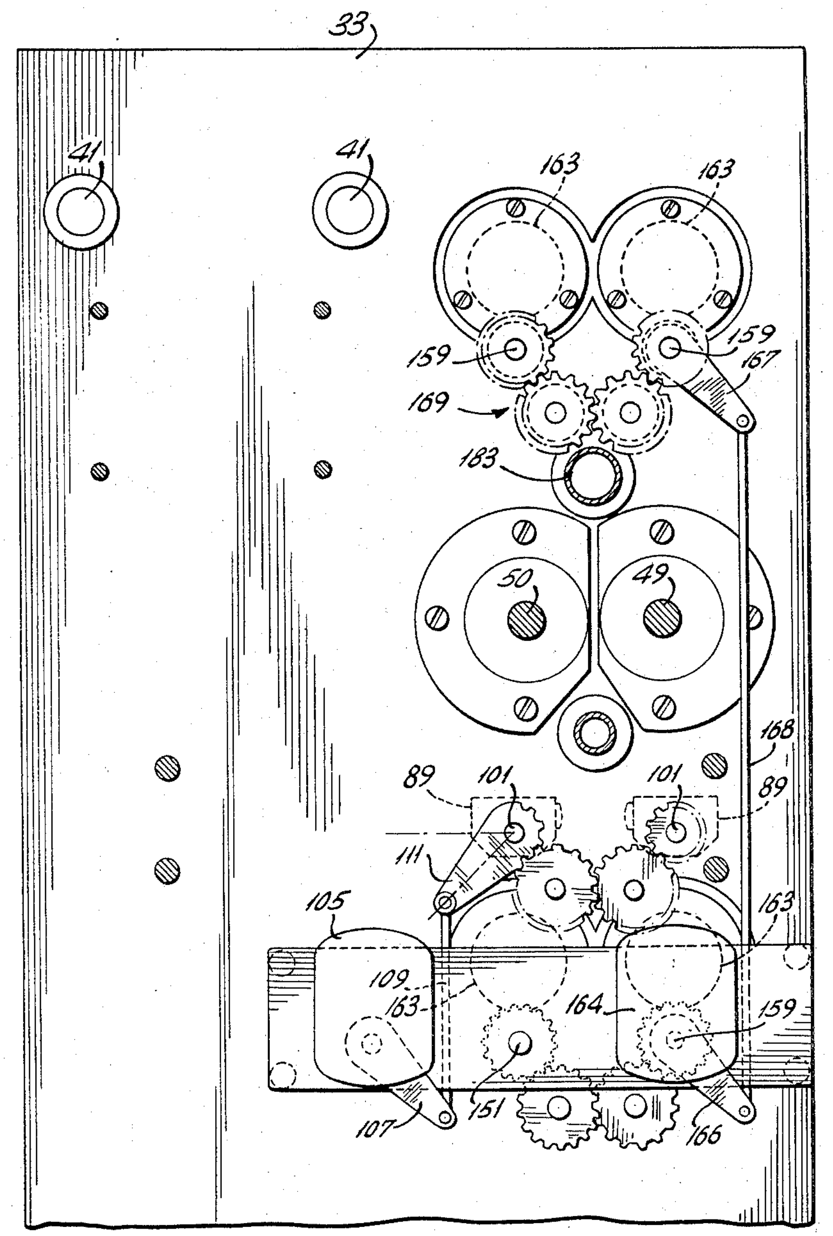
FIG. 5 is a sectional view showing the back of the memory taken along lines 5—5 of FIGS. 2 and 3.

The shafts 101, which drive the cams 91, are in turn driven by a motor 105 mounted on the back 53 of the wall 33 as best shown in FIG. 5. The motor 105 actuates the crank arm 107 and operates to move the crank arm 107 between two positions, one being the position shown in FIG. 5 at a 45° angle and the other position being horizontal.

A link 109 is connected pivotally at one end to the end of the crank arm 107 and is connected pivotally at the other end to a crank arm 111, so that movement of the crank arm 107 between its two extreme positions will move the crank arm 111 between the position in which it is shown in FIG. 5 and a horizontal position, as indicated. The crank arm 111 is fixed to one of the shafts 101 and rotates it between the two positions, one being where the cam 91 driven thereby is in its retracted position and the other being where the cam 91 is in its extended position. A gear segment on the crank arm 111 drives the other shaft 101 through a gear train 113 between the two positions where the cam 91 driven thereby is in its extended and retracted positions.

As shown in FIGS. 7, 8, 9 and 10, the upper turnarounds 61 are mounted between and fixed to a pair of plates 119 and 121, and the lower turn-arounds 61 are mounted between and fixed to a pair of plates 123 and 125. The plates 119, 121, 123 and 125, together with the adjacent channel separators 64, define the tape channels on the turn-arounds for the tapes on the ends of the two rows of tape loops.

The ends of the upper turn-arounds 61 extend through the plate 119 to receive the couplings 83, through which air passes into the upper turn-arounds 61. The ends of the lower turn-arounds 61 extend through the plates 123 to receive the couplings 85 through which air passes into the interior of the lower turn-arounds.

Figure 12:
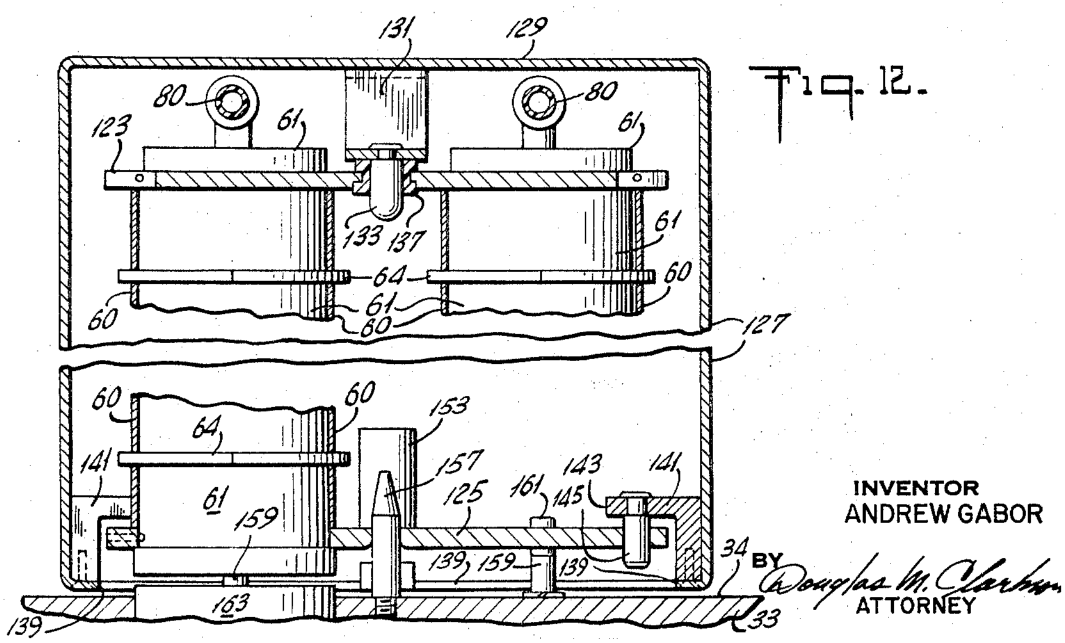
FIG. 12 is a sectional view taken along lines 12—12 of FIGS. 10 and 11.

The cartridge is provided with a casing 127 having an end wall 129. As shown in FIGURES 7, 11 and 12, a pair of brackets 131 are mounted on the inside of the end wall 129, and a pin 133 is mounted on each bracket 131 projecting horizontally into the casing 127. The pins 133 are positioned vertically one above the other and are received in slots 135 vertically disposed in the plates 119 and 123. Elongated grommets 137 are mounted in the slots 135 surrounding the pins 133, fitting closely against the sides of the pins 133 but permitting limited vertical relative movement between the pins and the plates 119 and 123.

Figures 9, 10, 13:
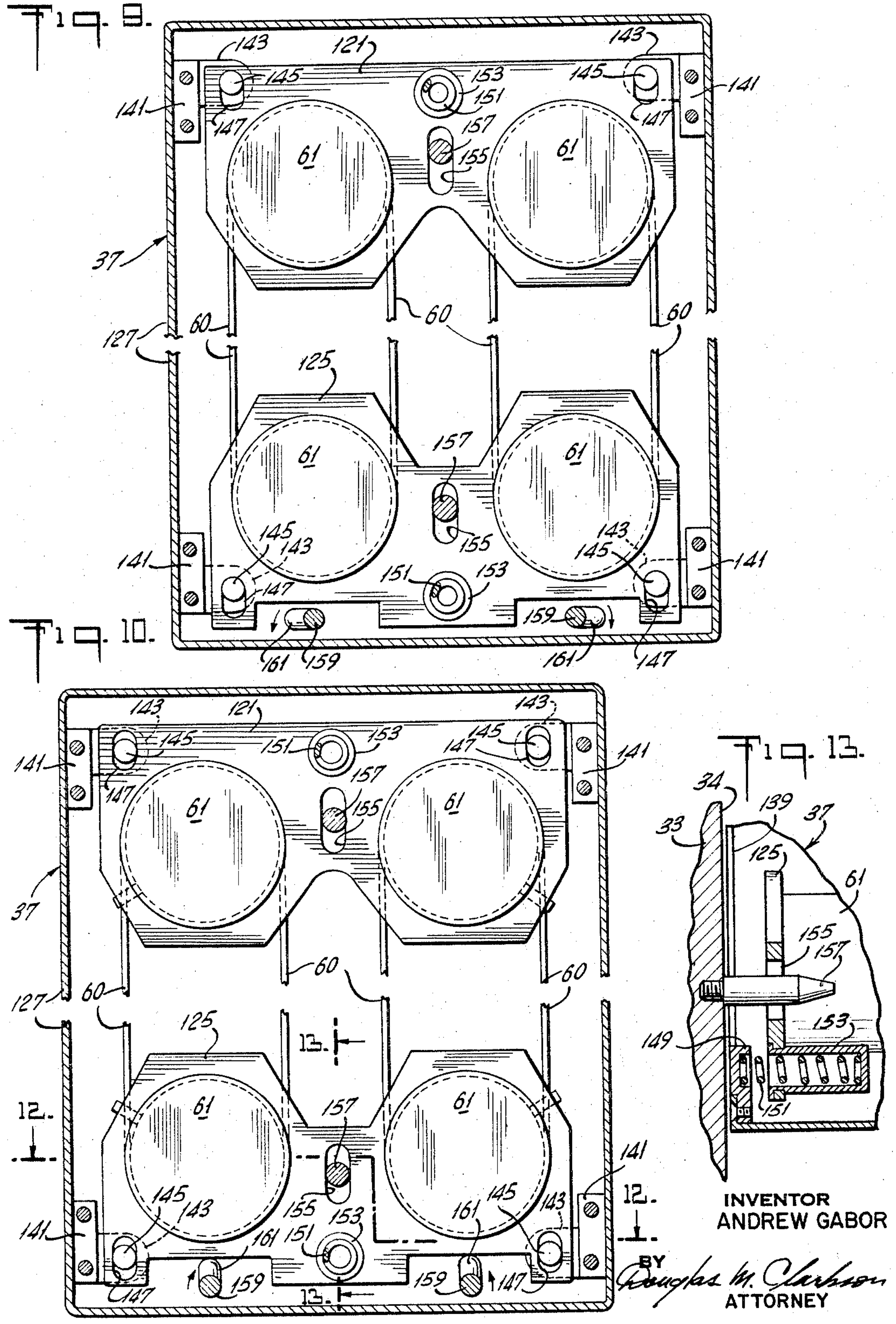
FIG. 9 is a sectional view taken along lines 9—9 in FIG. 7.
FIG. 10 is a sectional view taken along lines 10—10 of FIG. 8.
FIG. 13 is a sectional view taken along lines 13—13 of FIG. 10.

As shown in FIGURES 7 and 8, the front end of the cartridge casing 127 opposite the end wall 129 is open, and a lip 139 is provided around the opening. As best shown in FIGS. 9, 10 and 12, four L-shaped brackets 141 are fixed to the lip 139 within the corners defined by the lip and the side walls of the casing 127. These brackets have legs 143 which project behind the plates 121 and 125. A pin 145 is mounted in each leg 143 extending toward the front of the casing 127. The pins 145 are received in vertically disposed slots 147, which are defined in the plates 121 and 125 and which fit closely to the sides of the pins 145 but permit limited relative vertical movement between the pins 145 and the plates 121 and 125.

As is best shown in FIG. 13, a shallow spring receptacle 149 is fixed to the inner side of the lip 139 at the middle of the bottom wall of the casing 127. A coil spring 151 fits into the receptacle 149 and extends horizontally into a deep spring receptacle 153 fixed to the bottom of the plate 125. A similar spring and receptacle arrangement is provided between the top of the plate 121 and the lip 139 at the middle of the top wall of the casing. When the cartridge is not in its transducing position, the assemblies of the turn-arounds 61 and the plates 119, 121, 123 and 125 are supported in the casing by means of the pins 133 and 145, and the assemblies are forced back in the casing 127 by the springs 151 so that the grommets 137 abut against the brackets 131. The space between the legs 143 of the brackets 141 and the plates 121 and 125 permits the assemblies of the turn-arounds and the plates to have limited horizontal movement against the force of the springs 151.

The plates 121 and 125 have vertically disposed slots 155 defined therein between the turn-arounds 61. These slots receive pins 157 fixed to the front of the wall 33 when the cartridge is moved to its transducing position by the carriage 39. The pins 157 are provided with beveled ends and fit closely against the sides of the slots 155 but permit limited relative vertical movement between the pins and the plates 121 and 125. When the cartridge is moved into its transducing position by the carriage 39, the beveled ends of the pins 157 guide the slots 155 over the pins so as to align the turn-arounds 61 horizontally.

When the carriage 39 is moved to its "in" position, the cartridge that it carries will be brought to the position illustrated in FIGURES 7 and 9. The plates 121 and 125 will each be positioned over the ends of a pair of shafts 159 which extend through, and are rotatably mounted in, the wall 33. The shafts 159, which will be positioned directly beneath the turn-arounds 161, have formed on their ends short radially extending arms 161.

The shafts 159 are rotatable between the position where the arms 161 extend horizontally outward and the position where the arms extend vertically upward. When the cartridge is moved to the position shown in FIGURES 7 and 9, the arms 161 will be extending horizontally outward.

After the cartridge has been moved to the position shown in FIGURES 7 and 9, the shafts 159 are rotated to turn the arms 161 to their vertical positions. The arms 161 then will engage the bottoms of the plates 121 and 125 directly beneath the turn-arounds and lift the plates to the position illustrated in FIGS. 8 and 10. The ends of the turn-arounds 61, which extend through the plates 121 and 125, then will be aligned with the poles of permanent magnets 163.

The ends of the turn-arounds 61 are made of a low reluctance material so that the permanent magnets 163 will exert a pulling force on the ends of the turn-arounds 61. When the turn-arounds have been lifted to the position shown in FIGS. 8 and 10, the force exerted by the permanent magnets 163 will become sufficiently strong to overcome the force of the springs 151, and the ends of the turn-arounds will be pulled against the faces of the permanent magnet poles. The faces of the permanent magnet poles are machined so as to be precisely flat and precisely in the same vertical plane.

The ends of the turn-arounds are machined also so as to be precisely flat and to be precisely perpendicular to the axes of the turn-arounds. As a result, when the turn-arounds are pulled into engagement with the permanent magnets, they will all be aligned to have their axes aligned precisely horizontally and to have their channels precisely aligned with the transducing units 35. The slots in the plates 119, 121, 123 and 125 are elongated, and the flexible hoses 79 and 80 are flexible, to permit the motion of the turn-arounds under the action of the arms 161 and the permanent magnets 163.

The shafts 159 are driven between their two positions by means of a motor 164 mounted on the back of the wall 33, as is best illustrated in FIG. 5. The motor 164 directly drives one of the lower shafts 159 between its two angular positions and drives the other one of the lower shafts 159 between its two angular positions through a gear train 165. One of the upper shafts 159 is driven between its two angular positions by means of crank arms 166 and 167 and a link 168. The crank arm 166 is driven directly by the motor 164; the crank arm 167 drives the upper shaft 159, and the link 168 provides the driving connection between the crank arms 166 and 167. A gear segment on the crank arm 167 drives the other upper shaft 159 between its two angular positions through a gear train 169.

As shown in FIGS. 19–24, the transducing units 35 each comprise a drive block 170, and the drive blocks of each row of transducing units are separated by plates 171. A plate 171 also separates the innermost drive block of each row of transducing units from a mounting plate 172 on which the rows of transducing units are mounted directly. The mounting plate 172 is fastened on the wall 33 by means of screws.

Figure 6:
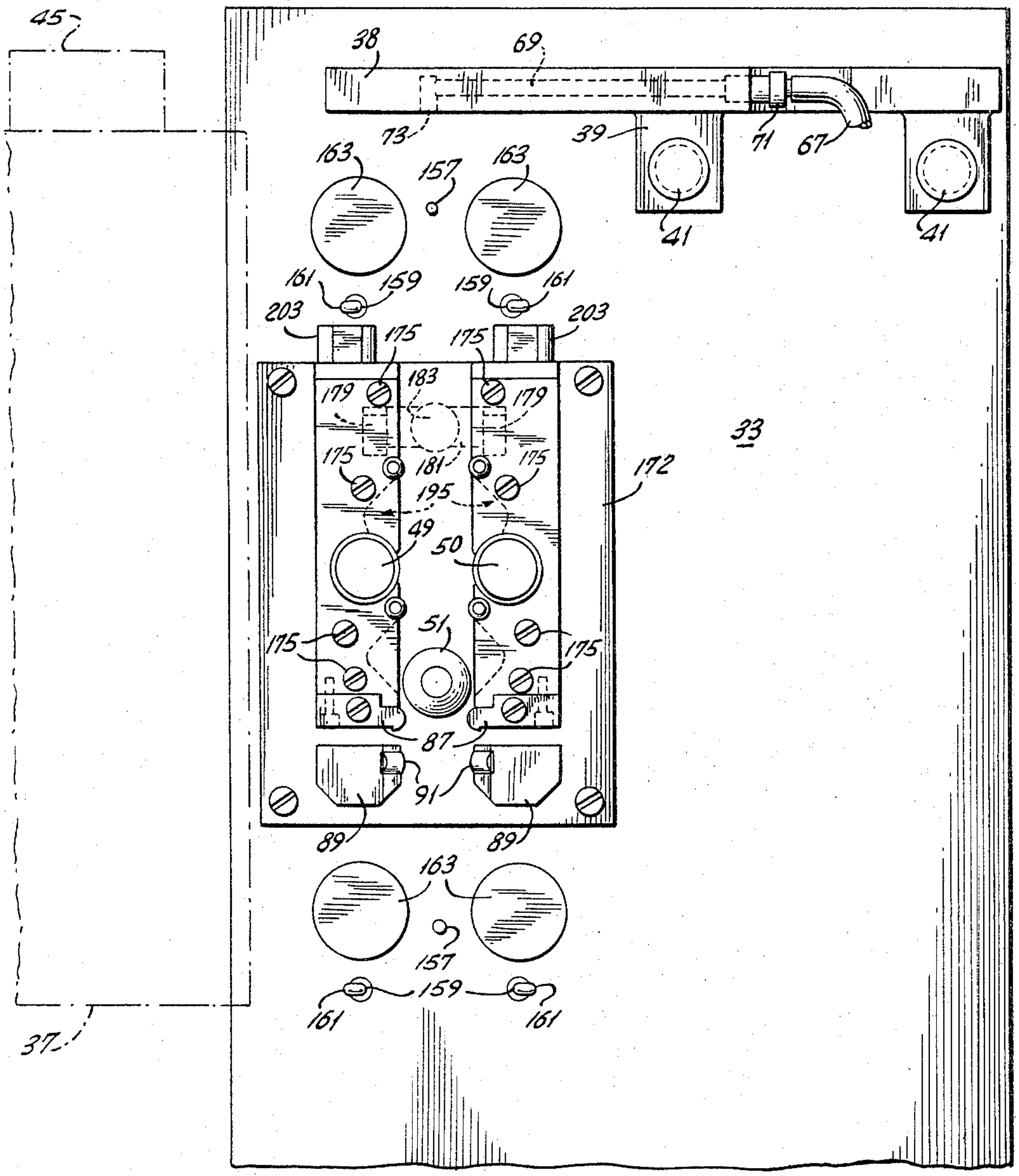
FIG. 6 is a front view in elevation of the random access memory with a cartridge containing the magnetic tape loops shown in phantom about to be mounted.

In FIG. 6, an end plate 173 covers the outermost drive block in each row. The assemblies of drive blocks and plates 171 and 173 are held together and fastened to the mounting plate 172 by means of screws 175 which pass through the entire row of drive blocks and are threaded into the mounting plate 172. A rectangular opening is defined through each drive block so that the assembly of drive blocks in each row together with the plate 173, which covers the opening in the outermost drive block, defines a manifold chamber 179 extending along the length of the row of transducing units.

The plates 171 are apertured in register with the openings that define the manifold chambers 179. A vacuum pump is connected to draw air from the manifold chambers 179 through a passageway 181 defined in the assembly of the mounting plate 172 and the supporting wall 33. The vacuum pump connects to the passageway 181 by means of a hose 183. A valve mechanism 185 is provided in each drive block to connect the manifold chamber 179 selectively either to a passageway 187 defined in the drive block or to a passageway 189 defined in the drive block.

While the cartridge is being moved to its transducing position, the vacuum pump will not be energized. After the cartridge has been moved to its transducing position and the turn-arounds have been pulled into engagement with the permanent magnets 163, the vacuum pump will be energized to draw air from the manifold chambers 179 extending along each row of transducing units. At this time all of the valve mechanisms 185 will be positioned to connect the manifolds 179 to the passageways 189.

The magnetic tape loops on the cartridge will be drawn to the position illustrated in FIG. 19 when the vacuum pump is energized.

As illustrated in FIG. 19, each drive block is surrounded by a tape loop, which is drawn into a pocket 191 in the front of the transducing unit defined by a contoured depression 193 in the drive block and the separating plates 171 extending up between the depressions 193. The pocket 191 is positioned opposite the head carrier 51 and extends up above the head carrier. The passageway 189 communicates with the pocket 191 in each drive block so that air being drawn through the passageway 189 into the manifold chamber 179 will pull the tape loop into the pocket 191.

Figure 21:
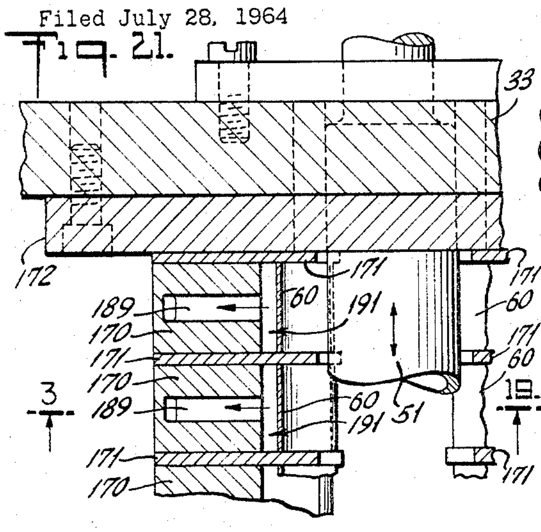
FIG. 21 is a sectional view taken along lines 21—21 of FIG. 19.

The sectional view in FIG. 21 shows the pocket 191 with the tape loops 60 drawn therein.

The drive blocks of each row of transducing units 35 are contoured to closely surround over half the cylindrical surface of the capstans 49 and 50 extending along each row. The separator plates 171 surround over three-quarters of the cylindrical surface of the capstans.

A second pocket 195 is formed above the capstan in each transducing unit. This pocket 195 is defined by a contoured depression 197 in the front of the drive block 170, the capstan itself, to which the depression extends, and the separating plates 171 which extend up between the depressions 197 and around the capstan. The pocket 195 in front of each transducing unit communicates with the passageway 187 defined in the drive block of the transducing unit.

When it is desired to perform a transducing operation on one of the tape loops, the valve mechanism 185 in the transducing unit for the selected tape is turned to communicate the manifold chamber 179 with the passageway 187 in this transducing unit. As a result, air will be drawn in through the pocket 195 on this transducing unit and through the passageway 187 into the manifold chamber 179, and the flow of air into the pocket 191 and through the passageway 189 will be cut off.

As a result, the tape loop will be drawn into the pocket 195 and will be released from the pocket 191. Accordingly, the tape will assume the position shown in FIG. 20.

Upon being drawn into the pocket 195, the tape loop is brought into contact with the capstan and, upon being released from the pocket 191, is brought adjacent the head carrier as shown in FIG. 20. As a result, the tape will be driven by the capstan.

Figure 22:
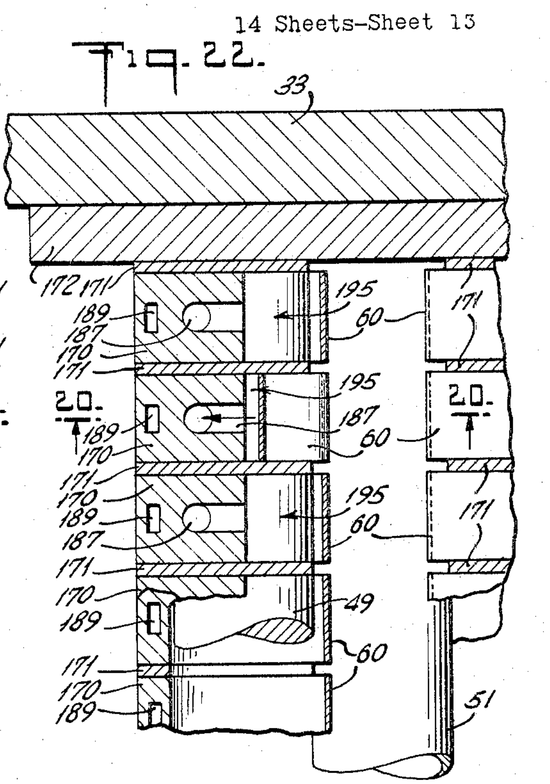
FIG. 22 is a sectional view taken along lines 22—22 of FIG. 20.
Figure 23:
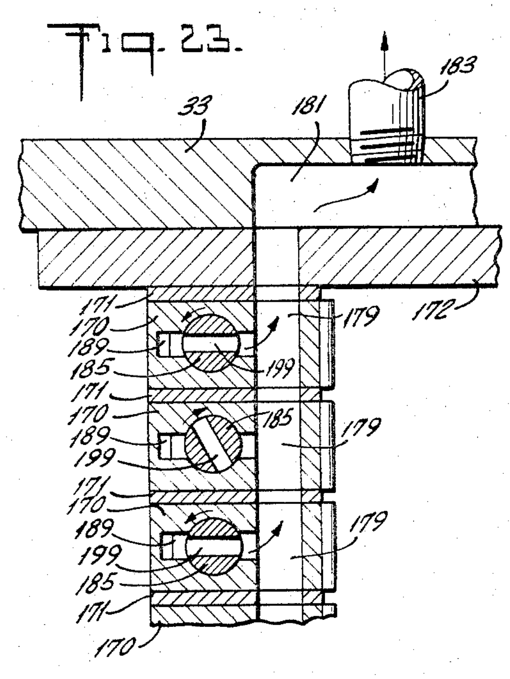
FIG. 23 is a sectional view taken along lines 23—23 of FIG. 20.
Figure 24:
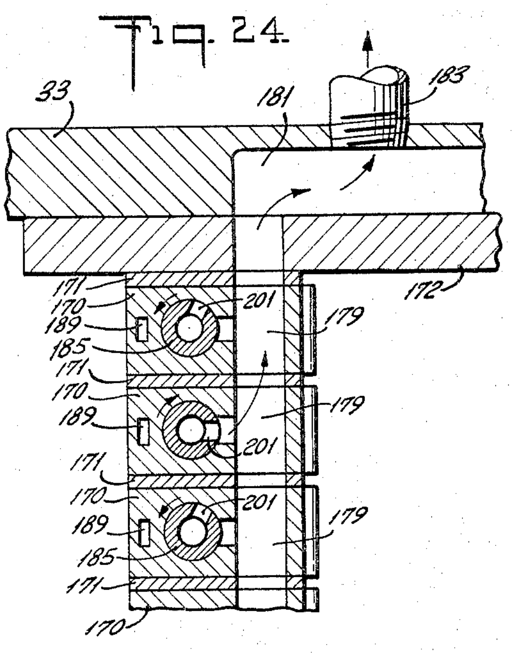
FIG. 24 is a sectional view taken along lines 24—24 of FIG. 20.

In the illustration of FIG. 20, the capstan rotates counter-clockwise, thus driving the tape in a counter-clockwise direction. The sectional view in FIG. 22 shows the pockets 195 with a tape loop 60 drawn into the second pocket 195 from the top.

As shown in FIG. 20, the head carrier is positioned so that the tape wraps slightly around it when it is released from the pocket 191, but as will be described in more detail below, an air bearing is generated between the tape and the head carrier, so that the tape does not actually come into contact with the head carrier. In this manner, the magnetic tape is brought into transducing relationship with the magnetic recording heads in the head carrier and is driven past these magnetic heads for a transducing operation.

The valve mechanism 185, as shown in FIGURES 19, 20, 23 and 24, comprises a cylindrical body, through which passageways 199 and 201 are formed. The cylindrical body is turnable in a bore defined in the drive block 170 between two positions by means of a rotary solenoid 203 which is mounted on top of the drive block.

In one position of the valve mechanism, the passageway 199 connects the manifold chamber 179 to the passageway 189, and in the other position, the passageway 201 connects the manifold chamber 179 to the passageway 187. Thus, the rotary solenoid 203, by rotating the valve mechanism 185 between its two positions, can connect the manifold chamber 179 selectively to either the passageway 187 or 189, and a magnetic tape loop can be selected for a transducing operation by energizing the proper rotary solenoid 203 to turn the corresponding valve mechanism 185, to communicate the manifold chamber 179 with the passageway 187 in the corresponding transducing unit.

Figure 14:
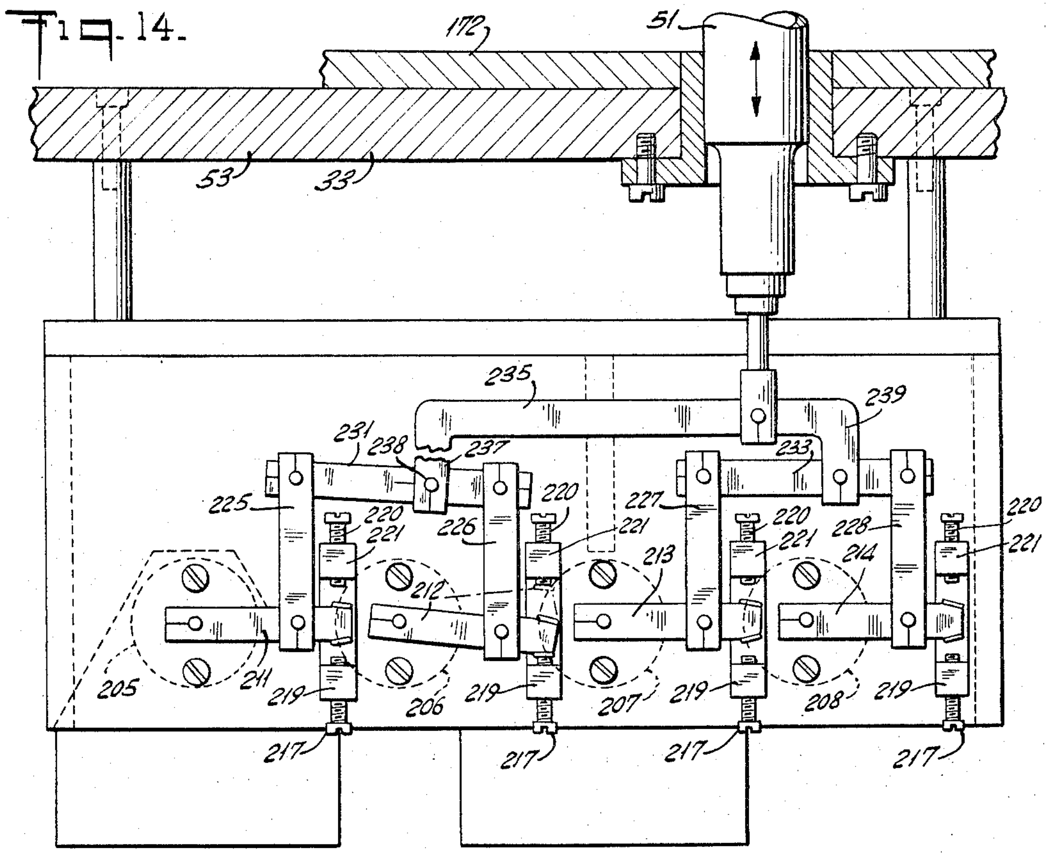
FIG. 14 is a sectional view taken along lines 14—14 of FIG. 2 illustrating the whippletree mechanism.

As best shown in FIG. 14, the whippletree mechanism, which controls the positioning of the cylindrical head carrier, comprises four rotary solenoids 205, 206, 207 and 208. The rotary solenoids 205 through 208 drive the crank arms 211 through 214, respectively, and operate to position the crank arms 211 through 214 either in a first position or in a second position.

The crank arms are disposed generally along a line perpendicular to the axis of the cylindrical head carrier 51. In their first positions, the crank arms 211 through 214 engage the ends of the screws 217, which are threaded through the blocks 219. By turning the screws 217 in the blocks 219, the first positions of the crank arms 211 through 214 can be adjusted individually.

The crank arms 211 through 214 engage the ends of screws 220 when the crank arms are in their second positions. The screws 220 are threaded into blocks 221, and by turning the screws 220 in the blocks 221, the second positions of the crank arms 211 through 214 can be adjusted individually. Between their first and second positions, the ends of the crank arms 211 through 214 are moved generally parallel to the axis of the head carrier 51.

The crank arms 211 through 214 are of equal lengths, and the links 225 through 228 are connected pivotally to points near the ends of the crank arms 211 through 214, respectively. The radial distances along each crank arm from their axes to the points where the links are connected are equal. The link 225 extends perpendicularly away from the crank arm 211, and the other end of the link 225 is connected pivotally to the end of a link 231 disposed generally parallel to the crank arm 211 and generally perpendicular to the axis of the head carrier 51.

The link 226 extends perpendicularly away from the crank arm 212, and the other end of the link 226 is connected pivotally to the other end of the link 231. As a result, one end of the link 231 will move back and forth between two positions corresponding to the movement of the crank arm 211 between its first and second positions, and the other end of the link 231 will move back and forth between two positions corresponding to the movement of the crank arm 212 between its first and second positions.

The movement of the ends of the link 231 generally will be parallel to the axis of the head carrier 51. The link 227 extends perpendicularly away from the crank arm 213, and the other end of the link 227 is connected pivotally to one end of a link 233 disposed generally parallel to the crank arm 213 and generally perpendicular to the axis of the head carrier 51. The other end of the link 233 is connected to the other end of the link 228, which extends perpendicularly away from the crank arm 214.

Thus, one end of the link 233 will be moved back and forth between two positions corresponding to the movement of the crank arm 213 between its first and second positions, and the other end of the link 233 will move back and forth between two positions corresponding to the movement of the crank arm 214 between its first and second positions. The movement of the ends of the link 233 will be generally parallel to the axis of the head carrier 51.

A link 235 extending generally parallel to the links 231 and 233 has a projection 237 at one end connected pivotally to the link 231 at a point 238 between the points where the links 225 and 226 are connected to the link 231. On the other end, the link 235 has a projection 239 connected pivotally to the link 233 at a point 240 between the points where the links 227 and 228 are connected to the link 233.

The pivot point 238 on the link 231 is two-thirds of the way from the point at which the link 225 is connected to the point where the link 226 is connected. The pivot point 240 on the link 233 is two-thirds of the way from the point at which the link 227 is connected to the point where the link 228 is connected. The pivot points 238 and 240 lie along a line generally perpendicular to the axis of the head carrier 51, and the distance between the pivot points 238 and 240 is one and two-thirds times the length of the links 231 and 233, which are of equal length.

The cylindrical head carrier extends through the mounting plate 172 and the supporting wall 33 and is mounted slidably for axial movement in the wall 33 and plate 172. The end of the cylindrical head carrier is connected pivotally to the link 235 at a point four-fifths of the way from the end of the link 235 connected to the link 231 to the end of the link 235 connected to the link 233. With this arrangement the head carrier can be moved axially to any one of sixteen incremental positions.

Movement of the crank arm 211 between its first and second positions will cause a change in the axial position of the head carrier of one incremental position. Movement of the crank arm 212 between its first and second positions will cause a change in the axial position of the head carrier of two incremental positions. Movement of the crank arm 213 between its first and second positions will cause a change in the axial position of the head carrier of four incremental positions, and movement of the crank arm 214 between its first and second positions will cause a change in the axial position of the head carrier of eight incremental positions.

Thus, by properly positioning the crank arms 211 through 214, any one of the sixteen incremental axial positions of the head carrier may be selected.

Figure 16:
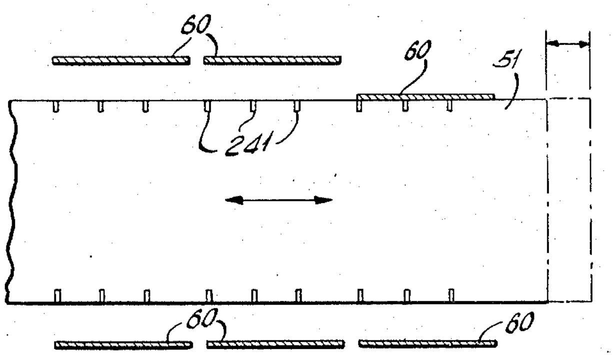
FIG. 16 is an enlarged view of the transducer head carrier illustrating the arrangement of the transducer heads on the transducer head carrier.

The head carrier has three transducing heads for each magnetic tape, and since there are sixteen tapes in a cartridge, the head carrier has forty-eight transducing heads contained therein. When the turn-arounds of a cartridge have been pulled into engagement with the permanent magnets, the three transducing heads for each tape will be directly opposite the tape, as is illustrated in FIG. 16. The transducing heads are designated by the reference number 241.

During a transducing operation, as explained above, the tape on which the transducing operation is to be carried out will be positioned adjacent the head carrier as exemplified by the upper right-hand tape 60 in FIG. 16. The tapes upon which no transducing operation is to be carried out will be positioned spaced away from the head carrier as exemplified by the remaining tapes shown in FIG. 16.

Figure 15:
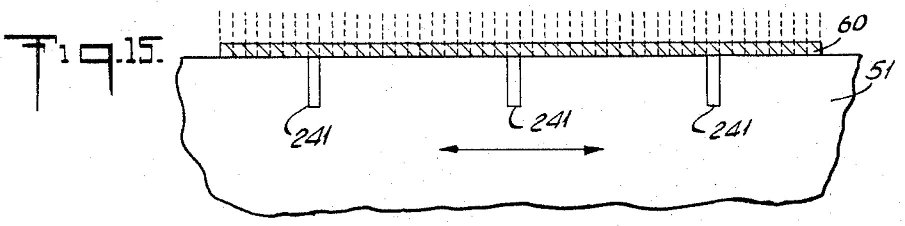
FIG. 15 is a greatly enlarged view of one tape in transducing relation with some transducer heads of the random access memory.

As illustrated in FIG. 15, there are forty-eight recording tracks arranged side by side across the tape 60 by moving the head carrier to its different axial positions, the recording head 241 opposite the left side of the tape can be moved to record or reproduce from any one of the sixteen tracks on the left side of the tape, the middle transducing head 241 can be moved to record or reproduce from any one of the middle sixteen tracks on the tape, and the transducing head 241 opposite the right side of the tape can be moved to record or reproduce from any one of the sixteen tracks on the right side of the tape.

The selection of the particular one transducing head, out of the three transducing heads which are opposite the selected tape, is made electronically. Thus, in the system of the present invention, a particular tape is selected by means of the rotary solenoid 203 mounted on top of the transducing units to bring the selected tape into transducing position and cause it to be driven by the capstan Then, the selection of one of the forty-eight tracks on the tape is made by mechanically positioning the head carrier by means of the whippletree mechanism and electronically selecting one of the three transducing heads opposite the selected tape.

Figure 26:
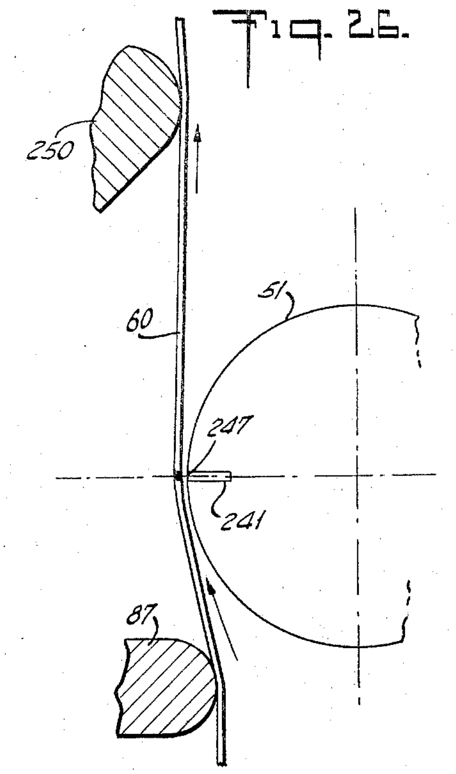
FIG. 26 is an enlarged view illustrating the position of a tape loop with respect to a transducer head and its carrier when the tape is moving at high speed during the transducing operation.

In the storage apparatus of the present invention, the tape that is selected for a transducing operation is driven at a high speed by the capstan. Due to the speed of the tape, an air bearing is generated between the tape and the head carrier, as illustrated in FIG. 26. The tape curves, or wraps around, the head carrier for a short angle, separated from the head carrier only by the air bearing. This angle is referred to as the "wrap angle," and the center of this angle is referred to as the "center of wrap."

When the tape is driven at a high speed, an aerodynamic effect causes the center of wrap to shift in the direction of movement of the tape. This phenomenon is illustrated by FIGS. 25 and 26.

Figures 25, 27:
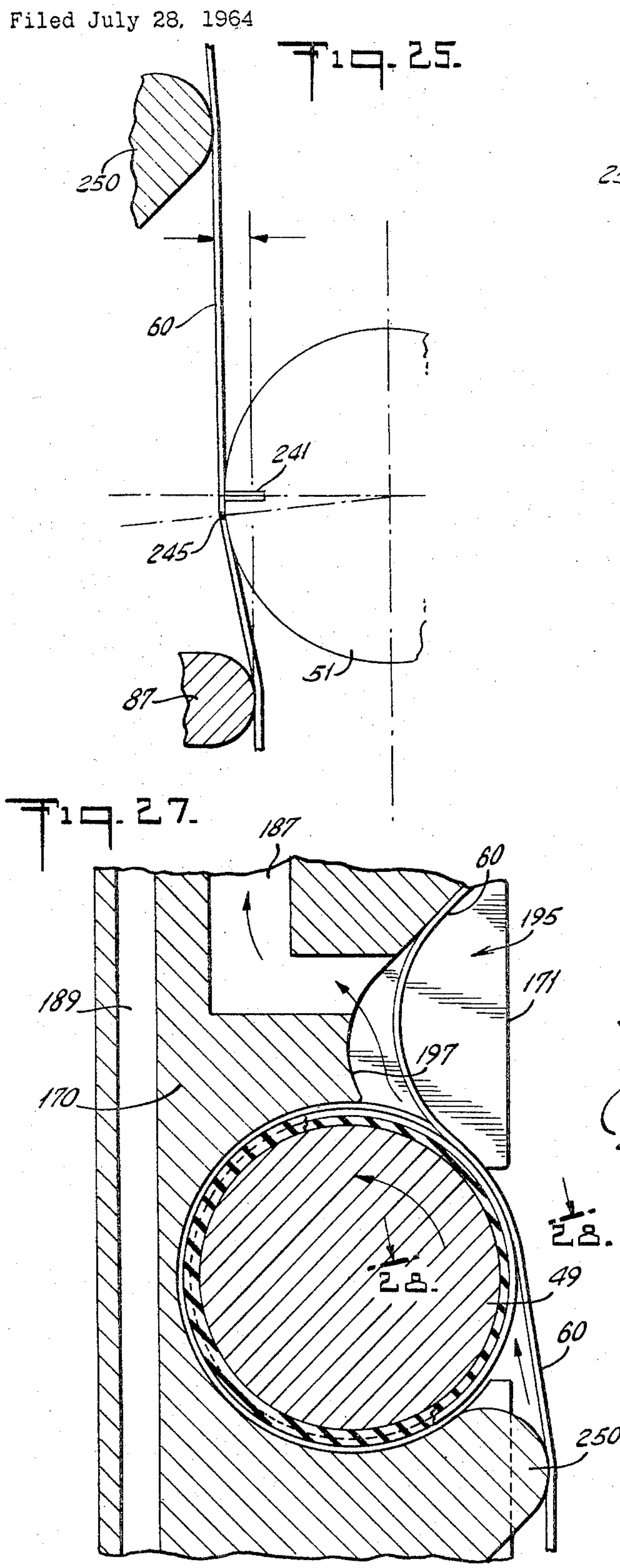
FIG. 25 is an enlarged view illustrating the position that a tape loop would assume with respect to the transducer head and its carrier if it were brought into transducing position but were not moving.
FIG. 27 is an enlarged sectional view illustrating the capstan driving a tape loop.

In FIG. 25, the tape is shown as it would be if it were positioned adjacent the head carrier as it is during a transducing operation but were not moving. In other words, FIG. 25 shows the position that the tape would be in if the valve mechanism 185 in the transducing unit for the tape were turned to pull the tape into the pocket 195 and release it from the pocket 191, but the capstan were not turning.

In operation, the capstan is always turning, so the condition depicted in FIGURE 25 actually never occurs. As shown in FIG. 25, the center of wrap is at the point 245.

With the tape being driven at normal velocity, as shown in FIG. 26, the center of wrap is shifted to the point 247. The center of wrap is determined by the position of the tape guide 87, over which the tape travels below the head carrier, and a contour projection 250 of the drive block over which the tape is guided above the carrier. In the apparatus of the present invention, the contoured projection 250 and the tape guide 87 are positioned relative to the head carrier, so that the center of wrap that would occur under the conditions illustrated in FIG. 25, is shifted away from the center line of the transducing head 241 in a direction opposite to the direction of tape travel, so that when the tape is being driven at high speeds as it will be in a transducing operation.

The aerodynamic shift in the center of wrap brings the center of wrap in coincidence with the center line of the transducing head 241 as is illustrated in FIG. 26. Thus, the system of the present invention compensates for the aerodynamic shift in the center of wrap and prevents it from adversely affecting the recording operation.

As best shown in FIGURES 19 and 20, guides 87 have flanges 248 on each side between which the tapes are positioned. The flanges 248 accurately position the tapes horizontally along the head carrier 51. The spreaders 89 must maintain the tapes clear of these flanges 248 when a cartridge is being mounted on or removed from the supporting wall 33 to prevent the tapes from being damaged.

Figure 28:
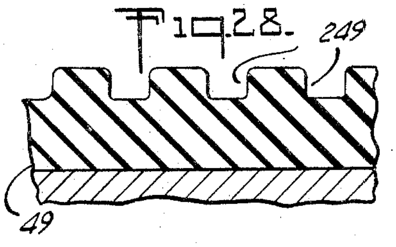
FIG. 28 is a sectional view taken along lines 28—28 of FIG. 27 illustrating details of the capstan.

As illustrated in FIGS. 27 and 28, the capstan which drives the tape is provided with grooves 249 which run circumferentially around the capstan. These grooves function to eliminate the air bearing that would normally exist between the capstan and the tape and, thus, permit the capstan to obtain a good frictional engagement with the tape to drive it. Because the driving surface of the capstan defines the entrance wall of the pocket 195, the air drawn in through the pocket 195 is drawn in part from the grooves 249. This reduces the pressure between the tape and the capstan and draws the tape more tightly into engagement with the capstan, thus providing a better frictional engagement between the capstan and the tape.

The above description is of a preferred embodiment of the invention, and many modifications may be made thereto without departing from the spirit and scope of the invention, which is defined in the appended claims.

What is claimed is:

1. A random access information memory device comprising:
- a plurality of discrete cartridges each containing a plurality of storage tape loops,
- supporting means to mount one of said cartridges interchangeably with the rest of said cartridges for transducing operations on the tape loops contained by such cartridge, and
- means to select one of the tape loops in the cartridge mounted on said supporting means and to carry out transducing operations on the selected tape.

2. A random access information memory device comprising:
- a plurality of discrete cartridges each containing a plurality of storage tape loops, each of said tape loops having a plurality of tracks on each of which information can be stored,
- supporting means to mount one of said cartridges interchangeably with the rest of said cartridges,
- means to select one of said tape loops contained by the cartridge mounted by said supporting means for transducing operations,
- means to select one of the tracks on the selected tape loops, and
- means to carry out transducing operations on the selected track of the selected tape loops.

3. A random access information memory device comprising:
- a plurality of cartridges each containing a plurality of storage tape loops, each of said tape loops having a plurality of tracks on each of which information can be stored,
- supporting means to mount one of said cartridges interchangeably with the rest of said cartridges,
- means to select one of said tape loops contained by the cartridge mounted on said supporting means,
- means to select one of the tracks on the selected tape loop, and
- means to carry out transducing operations on the selected track of the selected tape loop.

4. A memory comprising: a plurality of discrete cartridges each containing a plurality of storage tape loops, each of said storage tape loops having a plurality of tracks on which information can be stored; supporting means to mount at least any one of said cartridges interchangeably with others of said cartridges; means on said supporting means to perform transducing operations on any one of said tracks; and means to drive said storage tape loops relative to said transducing means when the cartridge containing them is mounted on said supporting means.

5. A memory comprising: a plurality of discrete cartridges each containing a plurality of storage tapes, said storage tapes each having a plurality of endless tracks on which information can be stored, thereby establishing a number of information storage tracks in each cartridge corresponding to the number of tracks on each tape times the number of tapes in each cartridge; transducing means to perform transducing operations on said storage tracks; means to support at least one of said cartridges interchangeably with the others of said cartridges and relative to said transducing means; and means to adjust the relative position of said transducing means and said storage tapes in said one cartridge so that transducing operations can be performed on a selected one of the storage tracks in said one cartridge.

6. A memory comprising: a plurality of cartridges each containing a plurality of flexible storage tape loops having spaced parallel edges; supporting means for mounting one of said cartridges interchangeably with the other of said cartridges; transducing means on said supporting means to perform transducing operations on said tape loops of the cartridge mounted on said supporting means; tape guide means defining a pair of mutually facing spaced guide surfaces for each tape loop in the cartridge mounted on said support to position the edges of each tape loop relative to said transducing means; and means to effect relative displacement of said guide means and said tape loops in a direction parallel to said guide surfaces; thereby enabling unobstructed movement of said cartridges and said tape loops therein relative to said supporting means and said tape guide means during mounting and demounting said cartridges.

7. A memory as recited in claim 6 wherein said last-mentioned means comprises cam means selectively removable between a first position and a second position and being operable in said second position to guide the tape loops contained by one of said cartridges around obstructions including said guide means when such cartridge is being mounted on said supporting means.

8. A memory device as recited in claim 7 wherein said cam means is mounted on said supporting means and defines a cam surface which is successively engaged by the tape loops in a cartridge when said cam means is in said second position and the cartridge is being mounted on said supporting means, said cam surface moving said tape loops laterally when they come into engagement therewith to guide the tapes around said obstructions.

9. A random access information memory device comprising:
- a plurality of cartridges each containing a plurality of storage tape loops and turn-arounds supporting said tape loops,
- a supporting means for mounting one of said cartridges interchangeably with the rest of said cartridges,
- transducing means mounted on said supporting means for carrying out transducing operations on the tapes contained by the cartridge mounted on said supporting means,
- cam means mounted on said supporting means defining a cam surface movable between first and second positions, said cam surface being positioned when in said second position to guide the tapes contained by one of said cartridges around obstructions on said transducing means when such cartridge is being mounted on said supporting means, and
- means to generate a cushion of air between the turn-arounds and the tape loops contained by one of said cartridges when the tapes of such cartridge are being guided by said cam surface.

10. A random access information memory device comprising:
- a plurality of cartridges each containing a plurality of storage tape loops and turn-arounds supporting said tape loops,
- supporting means for mounting one of said cartridges interchangeably with the rest of said cartridges,
- transducing means mounted on said supporting means to perform transducing operations on the tapes contained by the cartridge mounted on said supporting means, cam means mounted on said supporting means defining a cam surface operable to engage the tape loops contained by one of said cartridges and guide such tape loops around obstructions on said transducing means when such cartridge is being mounted on said supporting means, and means to generate a cushion of air between the turnarounds and the tape loops of one of said cartridges when such cartridge is being mounted on said supporting means.

11. A random access information memory device comprising:

a plurality of cartridges each containing a plurality of storage tapes, a supporting means, a transducing means mounted on said supporting means for performing transducing operations on said storage tapes, a carriage mounted on said supporting means to be movable between a first position and a second position, adapted to mount one of said cartridges interchangeably with the rest of said cartridges when in said first position, and operable to carry the cartridge mounted thereon between said first position and said second position, the cartridge mounted on said carriage positioning the tapes contained thereby adjacent said transducing means for transducing operations when said carriage is moved to said second position, and cam means operable to guide the tapes contained by the cartridge mounted on said carriage around obstructions on said transducing means when said carriage moves between said first and second positions.

References Cited

UNITED STATES PATENTS

| | | | |
|---|---|---|---|
| 3,278,188 | 10/1966 | Chamberlin | 179—100.2 |
| 3,183,494 | 5/1965 | Welsh | 340—174.1 |
| 2,918,656 | 12/1959 | Nolde et al. | 340—174.1 |
| 2,722,676 | 11/1955 | Begun | 340—174.1 |

TERRELL W. FEARS, *Primary Examiner.*

A. I. NEUSTADT, *Assistant Examiner.*